(No Model.)

J. E. PARKER.
PROCESS OF AND APPARATUS FOR EMBEDDING WIRE NETTING IN GLASS.

No. 516,223. Patented Mar. 13, 1894.

UNITED STATES PATENT OFFICE.

JOHN E. PARKER, OF PHILADELPHIA, PENNSYLVANIA, ASSIGNOR TO HORACE PETTIT, FRANK OVERN, AND JOHN OVERN, JR., OF SAME PLACE.

PROCESS OF AND APPARATUS FOR EMBEDDING WIRE-NETTING IN GLASS.

SPECIFICATION forming part of Letters Patent No. 516,223, dated March 13, 1894.

Application filed October 9, 1893. Serial No. 487,552. (No model.)

*To all whom it may concern:*

Be it known that I, JOHN E. PARKER, a citizen of the United States, and a resident of the city of Philadelphia and State of Pennsylvania, have invented a certain new and useful Process of and Apparatus for Embedding Wire-Netting in Glass, of which the following is a full, clear, and exact description, reference being had to the accompanying drawings, forming part of this specification.

My invention relates to an improved process of and apparatus for manufacturing sheet or plates of glass having embedded therein wire, or wire netting, and ordinarily known as "wire glass." Sheets of glass of this character are especially valuable in skylights, vaults, for port holes of vessels, &c., where strength is required.

Figure 1:
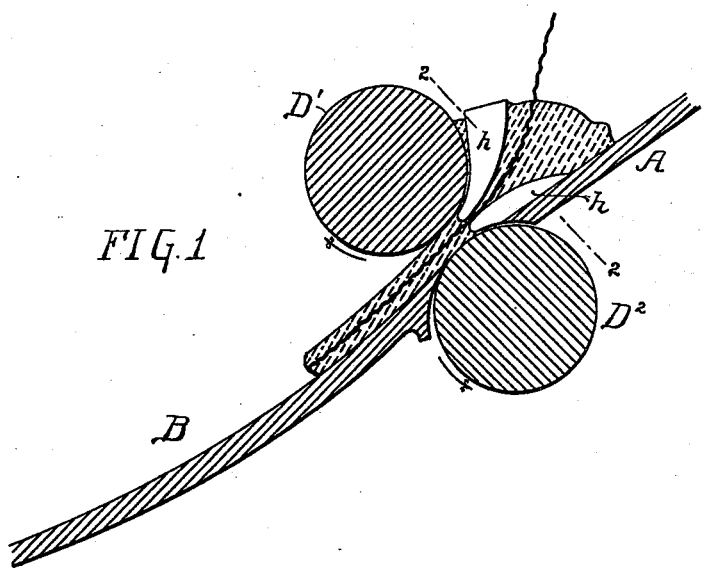
Figure 2:
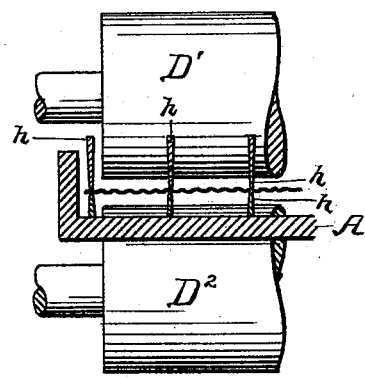

In the accompanying drawings:—Figure 1 is a sectional elevation of a machine by which my improved process may be carried into effect, and Fig. 2 is a transverse sectional elevation of the same on the line 2—2, Fig. 1.

In the manufacturing of wire glass, as has been hitherto practiced, various processes have been employed, one of which, for instance, consists in heating to about the fusing point two sheets of manufactured glass, then placing between them the wire netting and finally rolling the two sheets together.

Another method consists in first rolling a sheet of glass to the required thickness then pressing into the sheet from one face the wire gauze or netting and finally passing a roller over the sheet to close the openings made by the entrance of the wire netting. In these methods in the manufacture of the sheet in the first instance it is difficult to produce as finished a result, imperfect fusion is apt to occur, large sheets cannot readily be produced and more work is required; the second method has been found objectionable in that the passage of a roller over a quantity of molten glass to form a sheet will necessarily partially cool the glass and form a slight skin upon the upper surface which must be broken when the wire netting is forced into the same, this being particularly dangerous to the strength of the glass where the sheet is made thin enough for lights or when the surface of the sheet is to be finished and polished. A further objection to this latter method when heated wire is employed is that in order to introduce the wire gauze between the first and second rollers it must be placed upon a chute or guide upon the carrier which requires time and exposes the fine wire strands of the previously heated wire gauze netting to the cooling atmosphere before it is embedded in the glass.

Other methods and processes for manufacturing wire glass have heretofore been known but differing, however, from my improved process herein described, and producing inferior results.

In carrying out my invention, therefore, I propose to overcome these objections by embedding the wire netting in the glass before rolling the same into a sheet, and to this end I have devised a process which may be carried into effect by various mechanisms.

In Figs. 1 and 2, which illustrate a preferable construction of apparatus, I employ two pressing rollers, $D'$, $D^2$, which may be adjusted at such distance from each other as may be necessary to form a required sheet. Over the lower roller, $D^2$, of the pair is an inclined table, A, which with the upper roller forms a hopper or receiver into which the molten glass is poured, and on the opposite side is a receiving table, B, having a curved upper surface arranged to receive the resultant sheet. The wire gauze is guided centrally into the rollers, preferably by fixed guides, $h$, provided rigidly to the framework in front of one or both of the rollers, $D'$, $D^2$, at each end and, if desired, additional guides may be employed in the length of the rollers. The guides are preferably curved, as shown in the drawings, and quite thin to prevent as little displacement of glass as possible. They may be of any suitable construction. In operation the sheet of wire gauze is passed into the rollers, $D'$, $D^2$, in such manner as to be positively guided centrally between the rollers, and as they revolve the wire netting is gradually fed through. After the starting of the netting the molten glass is poured onto the table, A, from the ladle, or other vessel, from which it flows, or is drawn between the rollers and formed around the netting, the netting being firmly embedded within the now formed sheet of glass as it emerges on the opposite side of the rolls.

The wire netting may be introduced in my above described process either in cold or heated condition. It is clear that the wire being first centrally provided and the glass poured around it and through the meshes that the surface to be rolled will not be chilled, as is likely to occur in other known processes of this class, nor is the upper surface liable to contain particles of air as where the wire is forced through such surface after the first roll has passed over the surface, or even before it has, and such surface is not thereby in any manner disturbed. It is clear that a smoother, more highly finished sheet of glass can thus be produced.

Having thus described my invention, what I claim, and desire to secure by Letters Patent, is—

1. The herein described process of centrally embedding a strip of wire netting in a sheet of glass, consisting in flowing molten glass through the meshes of the wire netting, of passing the glass with the wire centrally embedded therein between two compressing rollers, of welding the two surfaces of glass formed on opposite sides of the netting together through the meshes of the wire netting, substantially as described.

2. The process of manufacturing sheets of wire glass, said process consisting in primarily passing a sheet of wire netting through a body of molten glass and thereby raising the temperature of the said netting; second centrally guiding said sheet of wire netting between two pressing rollers, third passing the molten glass through and between said pressing rollers compressing the glass on each side of the netting firmly together through the meshes of the netting and welding the glass, forming a layer of glass on each side of the said wire netting, the whole being formed into a single sheet of wire glass, substantially as described.

3. A machine for manufacturing wire glass consisting in a hopper, two compressing rollers disposed opposite each other and two series of thin guiding plates disposed at right angles to the line of the axes of the rollers said series secured in said hopper opposite each other at the entrance to the compressing rollers for centrally guiding the wire netting between the compressing rollers and at the same time to allow of the admission of the molten glass between the rollers on each side of the wire, substantially as described.

4. In a wire glass machine rollers, D', D², hopper provided above the rollers and two series of guiding plates, $h$, set at intervals and at right angles to the line of the axes of the rollers, said series disposed opposite each other at the entrance to the rollers, for centrally guiding the wire between the said rollers, substantially as described.

In witness whereof I have hereunto set my hand this 5th day of October, A. D. 1893.

JOHN E. PARKER.

Witnesses:
H. GORDON McCOUCH,
FRED. A. FLEISCHMANN.